US012056139B2

(12) United States Patent
Erickson et al.

(10) Patent No.: US 12,056,139 B2
(45) Date of Patent: Aug. 6, 2024

(54) COMPUTERIZED SYSTEM AND METHOD FOR AUTOMATICALLY DETECTING ANOMALIES IN DISTRIBUTED SCADA SYSTEMS AND DYNAMICALLY DISPLAYING A UNIFIED INTERFACE THEREFROM

(71) Applicant: AVEVA SOFTWARE, LLC, Lake Forest, CA (US)

(72) Inventors: Brian Kenneth Erickson, Long Beach, CA (US); Vinay T. Kamath, Rancho Santa Margarita, CA (US); William Charles Winn Bielke, Lake Forest, CA (US); Zhen Zhao, Sydney (AU)

(73) Assignee: Aveva Software, LLC, Lake Forest, CA (US)

( * ) Notice: Subject to any disclaimer, the term of this patent is extended or adjusted under 35 U.S.C. 154(b) by 0 days.

(21) Appl. No.: 17/096,354

(22) Filed: Nov. 12, 2020

(65) Prior Publication Data

US 2021/0141785 A1 May 13, 2021

Related U.S. Application Data

(60) Provisional application No. 62/934,082, filed on Nov. 12, 2019.

(51) Int. Cl.
*G06F 16/248* (2019.01)
*G06F 3/04817* (2022.01)
*G06F 16/17* (2019.01)

(52) U.S. Cl.
CPC ........ *G06F 16/248* (2019.01); *G06F 3/04817* (2013.01); *G06F 16/1734* (2019.01)

(58) Field of Classification Search
CPC . G06F 16/248; G06F 16/1734; G06F 3/04817
See application file for complete search history.

(56) References Cited

U.S. PATENT DOCUMENTS

| 10,599,449 B1* | 3/2020 | Chatzipanagiotis ..... G06N 3/04 |
| 2002/0049687 A1* | 4/2002 | Helsper ............... H04L 41/0213 |
| | | 706/45 |

(Continued)

FOREIGN PATENT DOCUMENTS

| KR | 10-2009-0000194 A | 1/2009 |
| KR | 10-2017-0028753 A | 3/2017 |

OTHER PUBLICATIONS

Korean Intellectual Property Office, International Search Report and Written Opinion issued for International Application No. PCT/US2020/060198, Mar. 2, 2021, 10 pages.

*Primary Examiner* — Daniel Samwel
(74) *Attorney, Agent, or Firm* — Dergosits & Noah LLP; Todd A. Noah

(57) ABSTRACT

Disclosed are systems and methods for improving interactions with and between computers in content providing, searching and/or hosting systems supported by or configured with devices, servers and/or platforms. The disclosed systems and methods provide a novel framework that automatically generates and dynamically updates an interactive user interface (UI) that comprises digital information related to multiple processes and operations. The UI provides uniform functionality across platforms, devices and/or services being utilized to view and/or interact with the UI and/or interface objects (e.g., tiles) included therein. The UI provides a dynamic mechanism for assets to be controlled, as well as mechanisms to compare the data of different assets by which certain assets can be subsequently manipulated. The UI enables the detection, and contextualized visualization of operational data for assets and/or locations in distributed supervisory control and data acquisition (SCADA) systems in Cloud connected environments.

20 Claims, 10 Drawing Sheets

(56) References Cited

U.S. PATENT DOCUMENTS

| | | | |
|---|---|---|---|
| 2012/0016607 A1 | 1/2012 | Cottrell et al. | |
| 2012/0084662 A1* | 4/2012 | Navarro | H04N 21/4227 715/740 |
| 2016/0330225 A1* | 11/2016 | Kroyzer | G06N 20/00 |
| 2018/0349482 A1* | 12/2018 | Oliner | G06F 16/38 |
| 2018/0357292 A1* | 12/2018 | Rai | G06N 20/00 |
| 2019/0271666 A1 | 9/2019 | Pellegrino et al. | |
| 2019/0325664 A1 | 10/2019 | Oronte et al. | |
| 2020/0292608 A1* | 9/2020 | Yan | G06N 3/0445 |

* cited by examiner

| <Any Time> ⌄ | Feedback Filter: |
|---|---|
| <Any Time> | Location |
| Last 24 Hours | |
| Today | |
| This Week | urne |
| This Month | |

FIG. 9

514 ack Filter: | <All> ⌄
Location | <All>
| No Feedback | ather ID was
| Relevant Anomalies |
| Irrelevant Anomalies | e Weather ID
| Non-anomalies | ssure was lo Melbourne, Pressure w Melbourne, Wind Spee

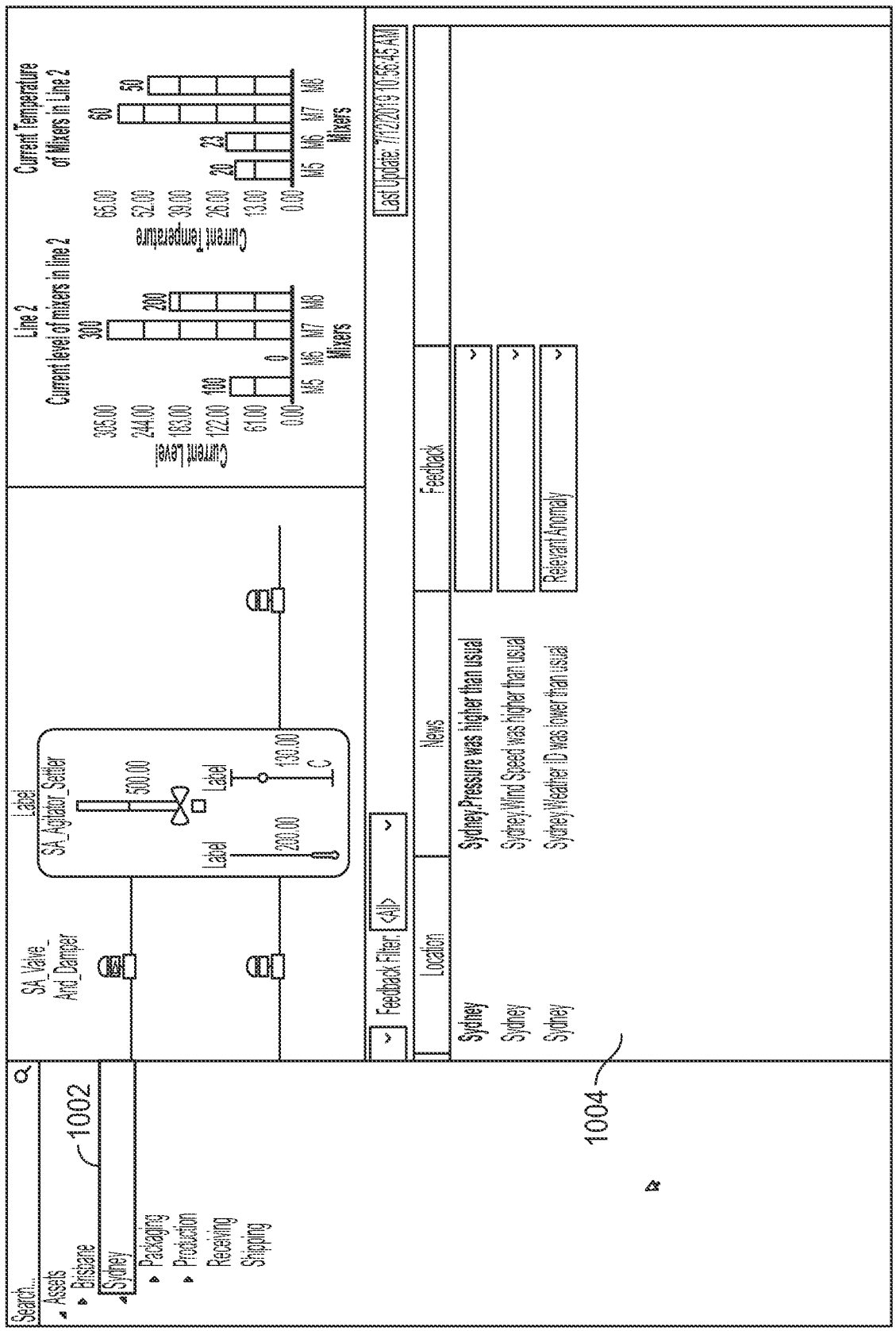

COMPUTERIZED SYSTEM AND METHOD FOR AUTOMATICALLY DETECTING ANOMALIES IN DISTRIBUTED SCADA SYSTEMS AND DYNAMICALLY DISPLAYING A UNIFIED INTERFACE THEREFROM

CROSS-REFERENCE TO RELATED APPLICATIONS

This application claims the benefit of priority from U.S. Provisional Application No. 62/934,082, filed Nov. 12, 2019, entitled "Reporting Anomalies in Distributed SCADA Server and System," which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

Some embodiments relate generally to improving the performance of network-based computerized content hosting and providing devices, systems and/or platforms by modifying the capabilities and providing non-native functionality to such devices, systems and/or platforms through a novel and improved asset management and visualization framework for automatically detecting anomalies in distributed SCADA systems and dynamically displaying a unified interface therefrom.

BACKGROUND

As more data get logged into databases, cloud servers, operational historians and/or any other type of software-based and hardware supported local and/or network configured data store(s), customers, and the systems and services associated therewith, are looking for computerized mechanisms for managing, understanding and displaying the data.

Conventional mechanisms are failing, as they are leading to loss of data, increased bottlenecking and inefficiency in data reception and presentation, and an overall lack of organization in the way the data is protected, provided and displayed to users. Moreover, mishandling of assets, asset data, operations as a whole, and the like, has caused a reduction in task efficiency, as well as the unnecessary drainage of resources.

SUMMARY

The existing technological failings in the computerized fields of data storage, retention and presentation are currently lacking online or computerized mechanisms that enable automatic, dynamically determined and updated interactions to facilitate how and which manner the data is compiled, presented and/or interacted with. The disclosed systems and methods, among other features, provide the disclosed asset management and visualization framework to address these needs and more.

According to some embodiments, the disclosed framework executes systems and methods that automatically generate and dynamically update an interactive user interface (UI) that comprises digital information related to multiple processes and operations. The UI provides uniform functionality across platforms, devices and/or services being utilized to view and/or interact with the UI and/or interface objects included therein. The UI provides a dynamic mechanism for assets to be controlled, as well as mechanisms to compare the data of different assets by which certain assets can be subsequently manipulated.

In some embodiments, the disclosed systems and methods provide electronic mechanisms to detect and report anomalies interactively in distributed supervisory control and data acquisition (SCADA) systems in Cloud connected environments. The disclosed UI framework enables novel mechanisms for data monitoring and asset or location (e.g., plant) control all from the unified UI disclosed herein.

In some embodiments, the UI provides a contextualized visualization of anomalies that enables operators to focus more on exceptions related to their area of control without sifting through volumes of data.

In some embodiments, the UI provides functionality for electronic filtering and navigation of asset/location data, which enables users to identify similar cases in the past or another area of the plant.

In some embodiments, the asset/location data, as well as the filtering and navigation history of particular users and/or tasks can be stored, in for example a cache. Caching of the data allows continued operation in intermittently connected scenarios. In some embodiments, collected and cached anomalies can be stored and/or detected from cloud data (e.g., from analysis of data communicated to, stored in, or retrieved from a Cloud server or associated datastore).

Some embodiments comprise asset-based visualization of anomalies. Some embodiments comprise connected and disconnected systems. Some embodiments comprise distributed asset systems. Some embodiments comprise configurable filtering and visualization. In some embodiments, displays can be tied to a SCADA navigation context.

Some embodiments comprise contextualized asset based news. As discussed herein, the news can be configured as an interface object depicted within the disclosed UI. Such news can be related to a particular asset, a job, task or operation, a location, a user, and the like, or some combination thereof. For example, news can correspond to a detected anomaly of an asset's operation.

In some embodiments, the disclosed UI framework can be embodied as a newsfeed client control module that can be integrated into system platform human-machine interface (HMI). The UI as an HMI is configured as, for example, a tool operators and line supervisors can utilize to coordinate and control industrial and manufacturing processes and machines. HMIs translate complex process variables into usable and actionable information.

In some embodiments, the UI framework can be a centralized cloud-based or web-based interface that client systems can access and utilized from remote locations.

According to some embodiments, a computer-implemented method is disclosed which automatically detects anomalies in distributed SCADA systems and dynamically displaying a unified interface therefrom.

Some embodiments provide a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like) cause at least one processor to perform a method for a novel and improved framework for detecting anomalies in distributed SCADA systems and dynamically displaying a unified interface therefrom.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

According to some embodiments, a computing device is disclosed which comprises: one or more processors; and a non-transitory computer-readable memory having stored therein computer-executable instructions, that when executed by the one or more processors, cause the one or more processors to perform actions causing a display of a user interface (UI), the actions comprising: receiving, over a network, electronic data related to an operation of a physical asset at location, the electronic data representing at least one detected anomaly by the asset during a time period; creating the UI, the UI comprising functionality for visibly displaying the received electronic data as interactive digital content; causing to be displayed, over the network, the UI on a display of a client computing device; receiving, from the client computing device, a request to filter the displayed electronic data; modifying the UI based on the filter request, the modification causing the UI to automatically alter a quantity and type of interactive digital content displayed within the UI; receiving, over the network, input from the second client device respective to a portion of the altered digital content, the portion corresponding to an anomaly by the asset; and electronically establishing, over the network, an electronic connection between the client device and a device associated the asset and the location, the established connection comprising functionality enabling the client device to control the asset over the network via the modified UI.

In some embodiments, the actions further comprise storing the electronic data in a cloud-based, network cache, wherein the receiving of the electronic data comprises retrieving the electronic data from the cache.

In some embodiments, the control comprises executing an application over the network, via the UI, that performs a maintenance operation on the asset.

In some embodiments, wherein the filter request is in response to interaction with at least a portion of the interactive digital content. In some embodiments, the actions further comprise analyzing the electronic data of the asset; and automatically generating, without user input, the filter request based on the analysis.

In some embodiments, the filter request comprises a set of criteria corresponding to a type of data included in the electronic data related to an anomaly. In some embodiments, the filter request enables navigation of particular types of asset data related to a plurality of locations.

In some embodiments, the electronic connection is established upon initial display of the UI on the client device.

In some embodiments, the actions further comprise collecting information related to the control over the asset. In some embodiments, the actions further comprise receiving a second set of electronic data based at least in part on the collected information.

In some embodiments, the actions further comprise collecting information related to the filter request and the modification of the UI. In some embodiments, the actions further comprise receiving a second set of electronic data; and causing the UI to be updated based on the second set of electronic data and the collected information.

In some embodiments, the actions further comprise analyzing the received electronic data; and determining a type of display format for the electronic data based on the analysis, wherein the display of the electronic data within the UI is based at least in part on the determined type.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 8 illustrates a non-limiting example embodiment of an interface object's functionality within an embodiment of a UI according to some embodiments of the present disclosure;

FIG. 9 illustrates a non-limiting example embodiment of an interface object's functionality within an embodiment of a UI according to some embodiments of the present disclosure;

FIG. 10 illustrates a non-limiting example embodiment of a UI and its functionality included therein according to some embodiments of the present disclosure; and FIG. 11 details a non-limiting data flow according to some embodiments of the present disclosure.

DESCRIPTION OF EMBODIMENTS

Figure 1:
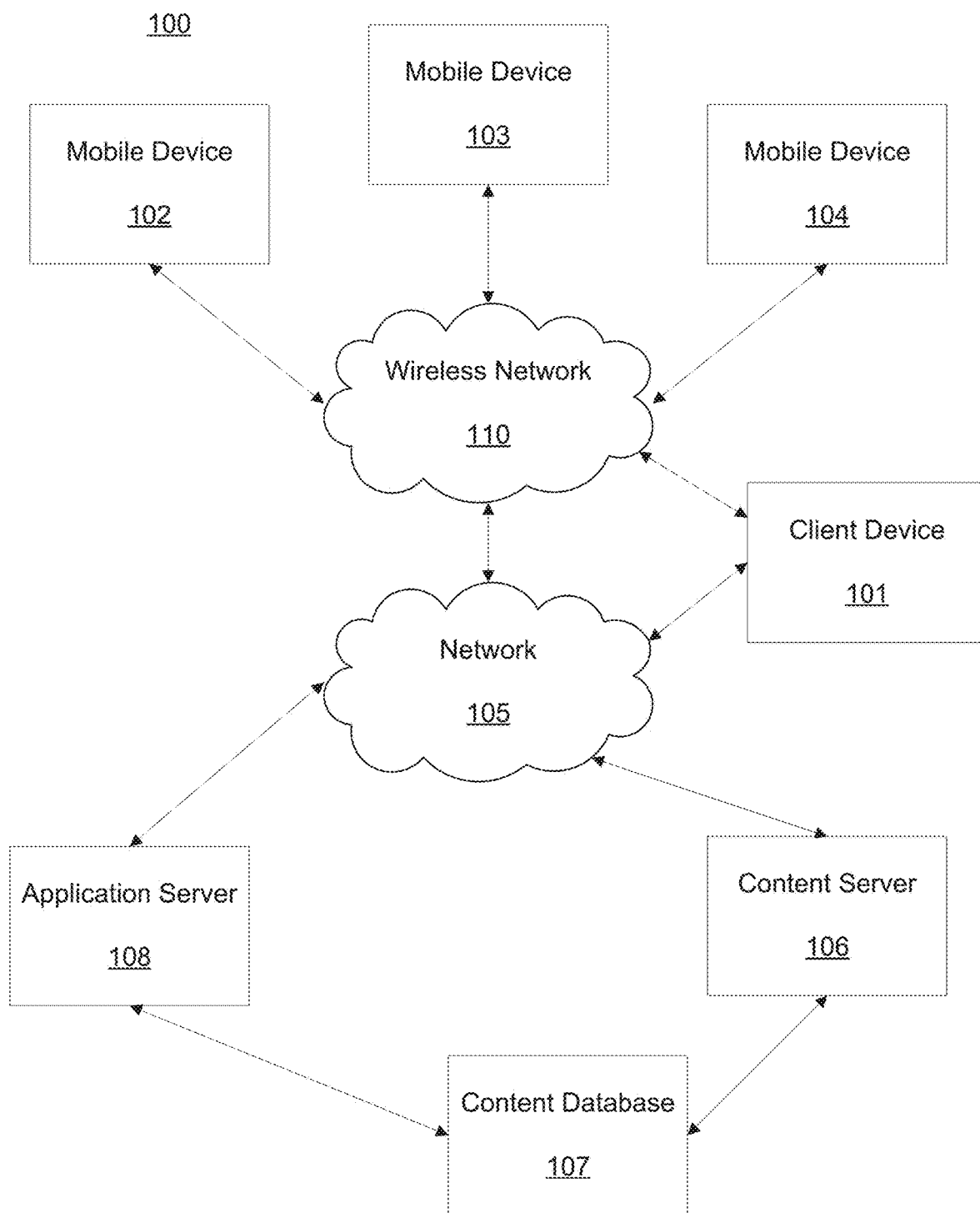
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data and user profile information (e.g., identifying, generated and/or observed information associated with a user).

In some embodiments, content server 106 and app server 108 can store various types of data related to the content and services each provide, observe, identify, determine, generate, modify, retrieve and/or collect. Such data can be stored in an associated content database 107, as discussed in more detail below.

In some embodiments, server 106 and/or 108 can be embodied as a cloud server or configured for hosting cloud services, as discussed herein.

In some embodiments, the network 105 is also coupled with/connected to a Trusted Search Server (TSS) which can be utilized to render content in accordance with the embodiments discussed herein. Embodiments exist where the TSS functionality can be embodied within servers 106 and 108.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in some embodiments, servers 106 and 108 may be integrated into a single computing device, without departing from the scope of the present disclosure.

Additionally, while the illustrated embodiment in FIG. 1 depicts only servers 106 and 108, it should not be construed as limiting, as any type and number of servers can be included therein.

Figure 2:
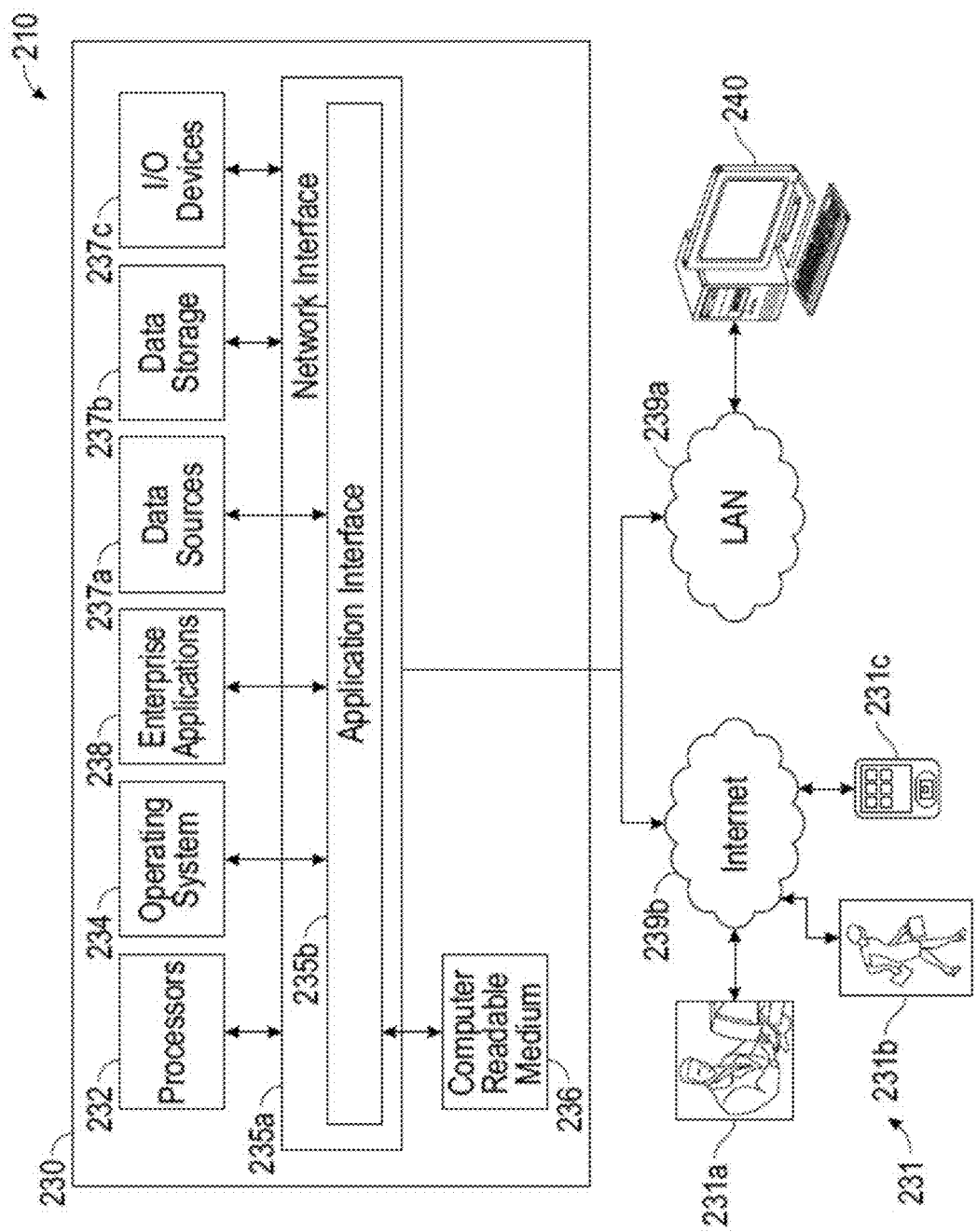
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating an embodiment of system 100 of FIG. 1, as discussed below. In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237a, and/or at least one data storage device 237b, and/or at least one input/output device 237c. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some embodiments, the user 231 can comprise a mobile user 231b coupled to the system 210. In some embodiments, the user 231b can use any mobile computing device 231c to wirelessly coupled to the system 210, including, but not limited to, personal digital assistants, and/or cellular phones, mobile phones, or smart phones, and/or pagers, and/or digital tablets, and/or fixed or mobile internet appliances.

Figure 3:
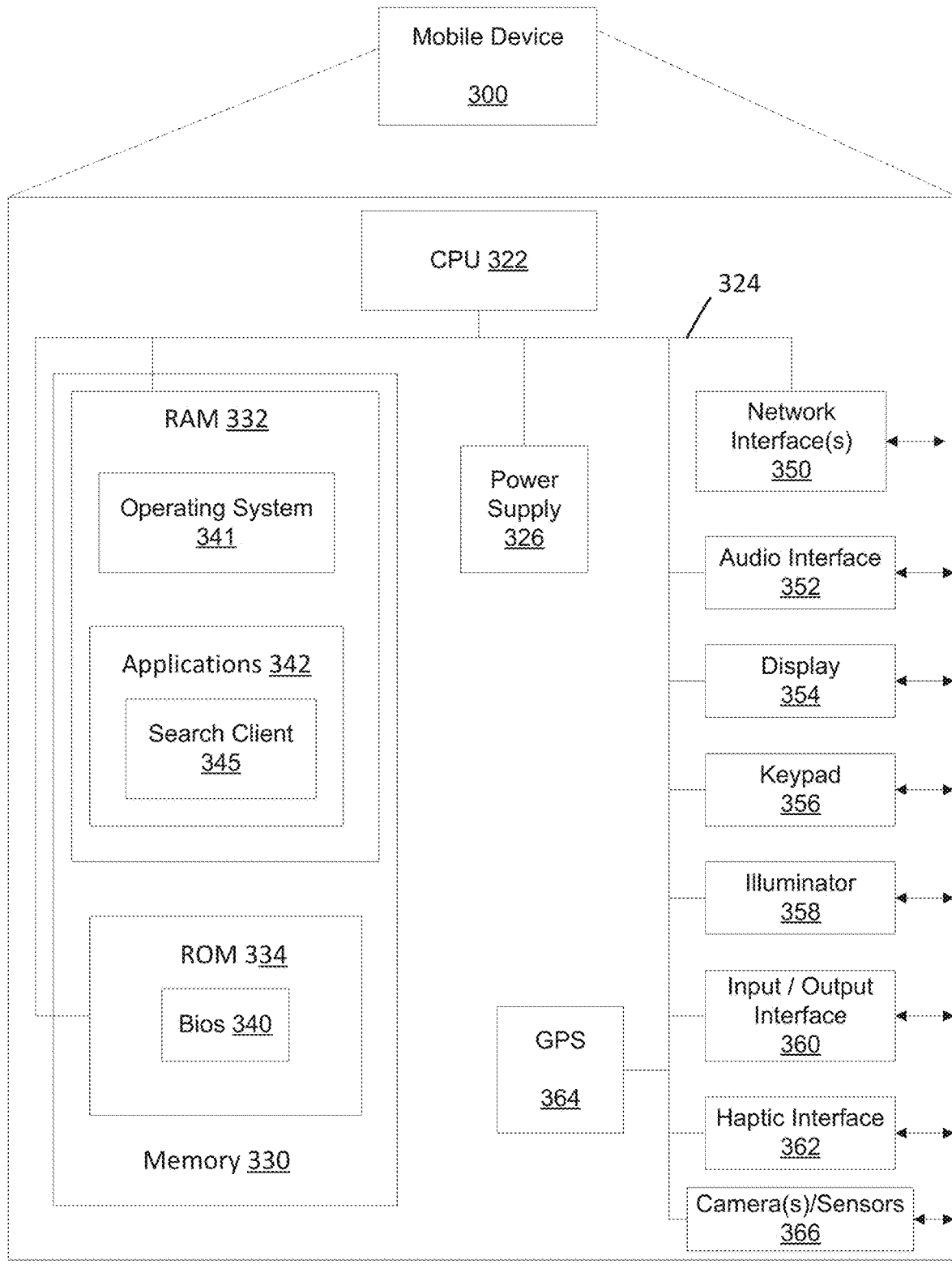
FIG. 3 depicts is a schematic diagram illustrating an example of client device according to some embodiments of the present disclosure.

FIG. 3 is a schematic diagram illustrating a client device showing an example embodiment of a client device that may be used within the present disclosure. Client device 300 may include many more or less components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, Client device 300 includes a processing unit (CPU) 322 in communication with a mass memory 330 via a bus 324. In some embodiments, Client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera(s) or other optical, thermal or electromagnetic sensors 366. Device 300 can include one camera/sensor 366, or a plurality of cameras/sensors 366, as understood by those of skill in the art. Power supply 326 provides power to Client device 300.

Client device 300 may optionally communicate with a base station (not shown), or directly with another computing device. Network interface 350 is sometimes known as a transceiver, transceiving device, or network interface card (NIC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, infrared, Bluetooth™, or the like. In some embodiments, haptic interface 362 is arranged to provide tactile feedback to a user of the client device.

Optional GPS transceiver 364 can determine the physical coordinates of Client device 300 on the surface of the Earth, which typically outputs a location as latitude and longitude values. GPS transceiver 364 can also employ other geo-positioning mechanisms, including, but not limited to, tri-angulation, assisted GPS (AGPS), E-OTD, CI, SAI, ETA, BSS or the like, to further determine the physical location of Client device 300 on the surface of the Earth. In some embodiments, however, Client device may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of Client device 300. The mass memory also stores an operating system 341 for controlling the operation of Client device 300.

In some embodiments, memory 330 further includes one or more data stores, which can be utilized by Client device 300 to store, among other things, applications 342 and/or other information or data. For example, data stores may be employed to store information that describes various capabilities of Client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 300.

In some embodiments, applications 342 may include computer executable instructions which, when executed by Client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

Figure 4:
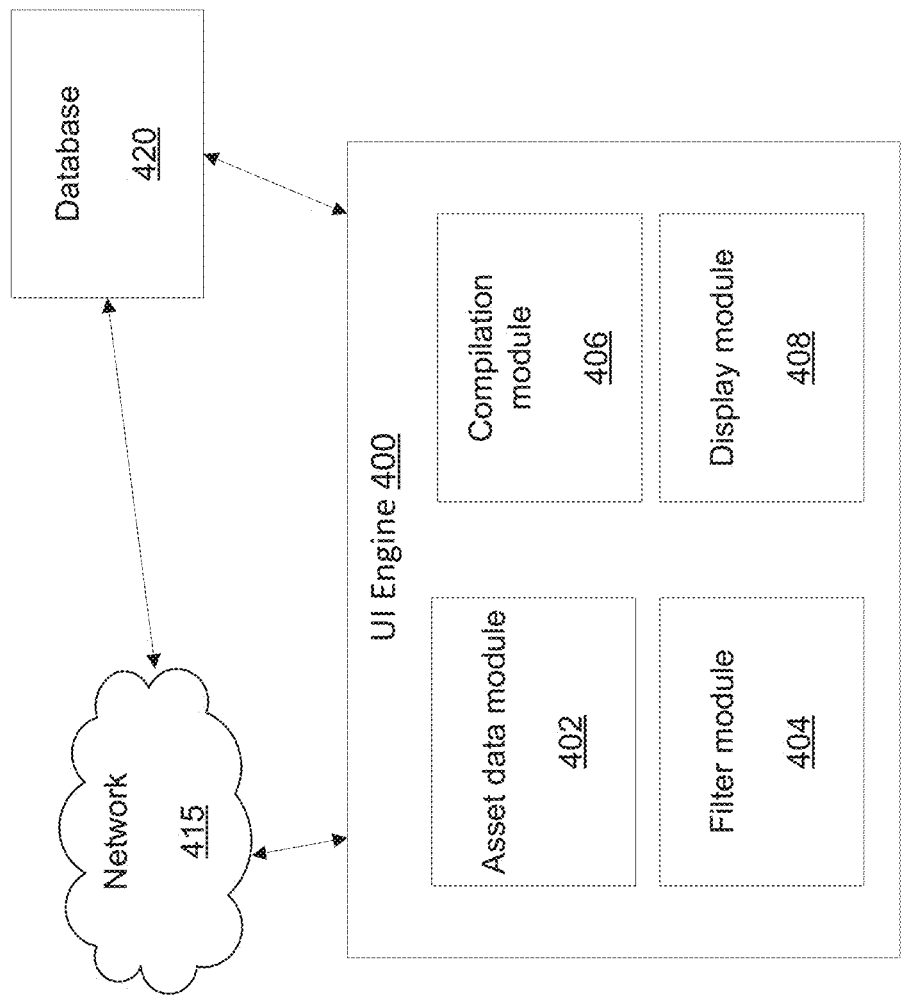
FIG. 4 is a block diagram illustrating components of an exemplary system in accordance with embodiments of the present disclosure.

FIG. 4 is a block diagram illustrating the components of some embodiments. FIG. 4 includes UI engine 400, network 415 and database 420. The user interface (UI) engine 400 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, UI engine 400 can be embodied as a stand-alone application that executes on a server and/or user device (e.g., on a cloud server and/or on-prem on a user device or local storage). In some embodiments, the UI engine 400 can function as an application installed on a device; and, in some embodiments, such application can be a web-based application accessed by a device over a network.

The database 420 can be any type of database or memory, and can be associated with a content server on a network (e.g., cloud server, content server, a search server or application server) or a user's device (e.g., client devices discussed above in FIGS. 1-3). Database 420 comprises a dataset of data and metadata associated with local and/or network information related to users, services, applications, content and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

According to some embodiments, database 420 can store data and metadata associated with users, operations, tasks, assets, files, projects, versions, synchronization events, schedules, images, videos, text, messages, products, items and services from an assortment of media and/or service providers and/or platforms, and the like.

According to some embodiments, database 420 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

In some embodiments, the user data can also include user device information, including, but not limited to, device identifying information, device capability information, voice/data carrier information, applications installed or capable of being installed or executed on such device, and/or any, or some combination thereof. It should be understood that the data (and metadata) in the database 420 can be any type of information related to a user, asset, location, job, operation, content, a device, an application, a service provider, a content provider, whether known or to be known, without departing from the scope of the present disclosure.

As discussed above, with reference to FIGS. 1-2, the network 415 can be any type of network such as, but not limited to, a wireless network, a local area network (LAN), wide area network (WAN), the Internet, or a combination thereof. The network 415 facilitates connectivity of the UI engine 400, and the database of stored resources 420. Indeed, as illustrated in FIG. 4, the UI engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as UI engine 400, and includes asset data module 402, filter module 404, compilation module 406 and display module 408. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning now to FIGS. 5-10, embodiments are discussed that disclose examples of how a user interface can display and manipulate asset data. According to some embodiments, asset data can correspond to an asset (e.g., a tool, referred to as a physical asset), a location, a task, an operation, a location and the like, or some combination thereof. In some embodiments, asset data discussed herein refers to data related to anomalies of a physical asset(s) at a location(s).

In some embodiments, as discussed below in relation to FIGS. 5-11, the disclosed UI can display the asset data in any form of electronic or digital information; however, it should not be construed as limiting, as any type of digital information can be displayed within the UI, whether known or to be known, without departing from the scope of the instant application. For example, the UI can display asset data as any type of image, text, video, tile, multi-media, RSS data, graphics, graphs, icons, charts, augmented reality (AR) depictions, virtual reality depictions (VR), messages, hyperlink (or URL) or any other type of interactive data or interface objects that detail operations of an asset(s) at a location(s), and the like, or some combination thereof.

Figure 5:
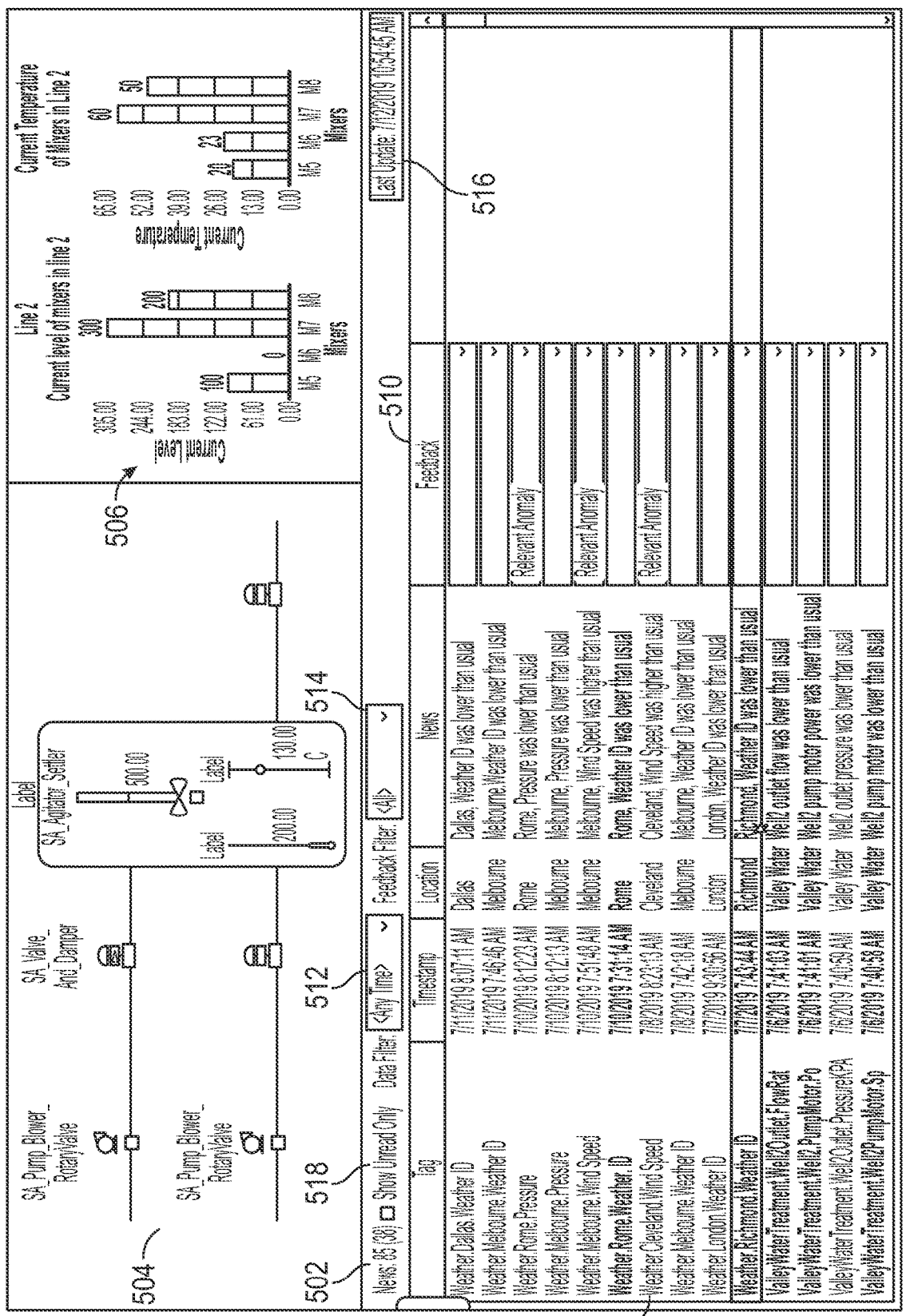
FIG. 5 illustrates a non-limiting example embodiment of a UI and its functionality included therein according to some embodiments of the present disclosure.

FIG. 5 illustrates UI 500, which provides an interactive display of interface objects and interface portions that relay a framework for understanding and controlling particular operations, both current and future ones. UI 500 depicts object 502 which provides an indication of "news", which corresponds to particular operations or measurements that have occurred—an example of past operational measurements is depicted in portion 508. This listing 508 can be sorted to rank or filter the operations based on a criteria, e.g., most recent, by date, and the like. Item 518 enables only operations that have yet to be viewed to be displayed within listing 508 (e.g., "unread" asset data).

Item 516 shows when the last update occurred. This last update can correspond to the last time a sort occurred, the last time an operation completed and its data was received, stored, compiled and/or depicted within the UI, and the like, or some combination thereof.

In some embodiments, selection of an item within listing 508 can cause the display of additional information within UI. This information can be displayed within dedicated portions—items 504 and 506. These portions, respectively, display asset functionality for particular tasks selected from listing 508. In some embodiments, items 504 and 506 can illustrate the current or past measurements or attributes of particular assets operating at particular locations in association with a particular operation(s).

In some embodiments, items 504 and 506 can be selected and moved to different positions of the UI. In some embodiments, items 504 and 506 can be moved into a different window and displayed adjacent window to the UI 500. In some embodiments, items 504 and 506 can be displayed as a separate tab(s) within UI, where listing 508 is one tab, and the other interactive tabs correspond to items 506 and 508, respectively.

Items 510, 512 and 514 provides functionality for further searching, filtering and sorting of the tasks listed in listing 508. The searching, filtering and/or sorting disclosed herein can be based on a combination of interaction with items 510-514, each individual item, or some combination thereof.

Figure 7:
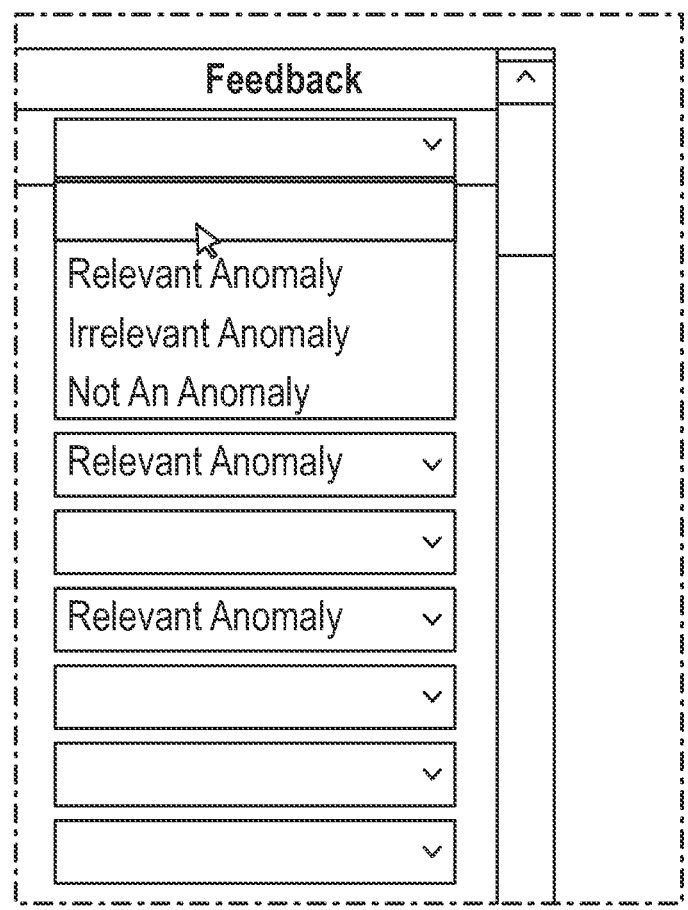
FIG. 7 illustrates a non-limiting example embodiment of an interface object's functionality within an embodiment of a UI according to some embodiments of the present disclosure.

Item 510, as also depicted in FIG. 7, enables a search for a type of data within an operation (e.g., a type anomaly—a relevant anomaly, irrelevant anomaly or not an anomaly, for example). Item 510 enables a search to be created and executed such that a task(s) within listing 508 is identified and is displayed. This would produce a modified listing 508 such that only the task(s) with the type of data identified in item 510 would be displayed within listing 508.

Item 512 enables, in a similar manner as discussed above in relation to item 510, a search for particular tasks within selected time frames. For example, such time frames can include, but are not limited to, anytime, last 24 hours, today, this week, and this month. In some embodiments, the time frames can be dynamically determined based on the data of an operation, or based on previously performed analysis of similar types of operations, assets or locations—for example, an asset of a particular type produces accurate data every 5 hours; this 5 hour period could be added as a selectable object within item 512's menu to recommend to the user when viewing another asset of the same type. Item 512 is also depicted in FIG. 8, and enables a modified listing to be displayed based on the selected and applied criteria.

Item 514 enables, in a similar manner as discussed above in relation to items 510-512, a search for particular tasks that have received a type of feedback—for example, as also illustrated in FIG. 9, no feedback, a relevant anomalies, irrelevant anomalies or non-anomalies.

For example, upon viewing data for a task, or based on a particularly applied machine-learning analysis (e.g., an artificial intelligence (AI) model) as discussed below in relation to Process 1100 of FIG. 11, it is determined that a data item originally categorized as an anomaly is not actually an anomaly, then that data can be modified and stored with data indicating such feedback. Upon selecting "non-anomalies" in item 514, the listing 508 can be modified to display this task based on its received feedback.

Figure 6:
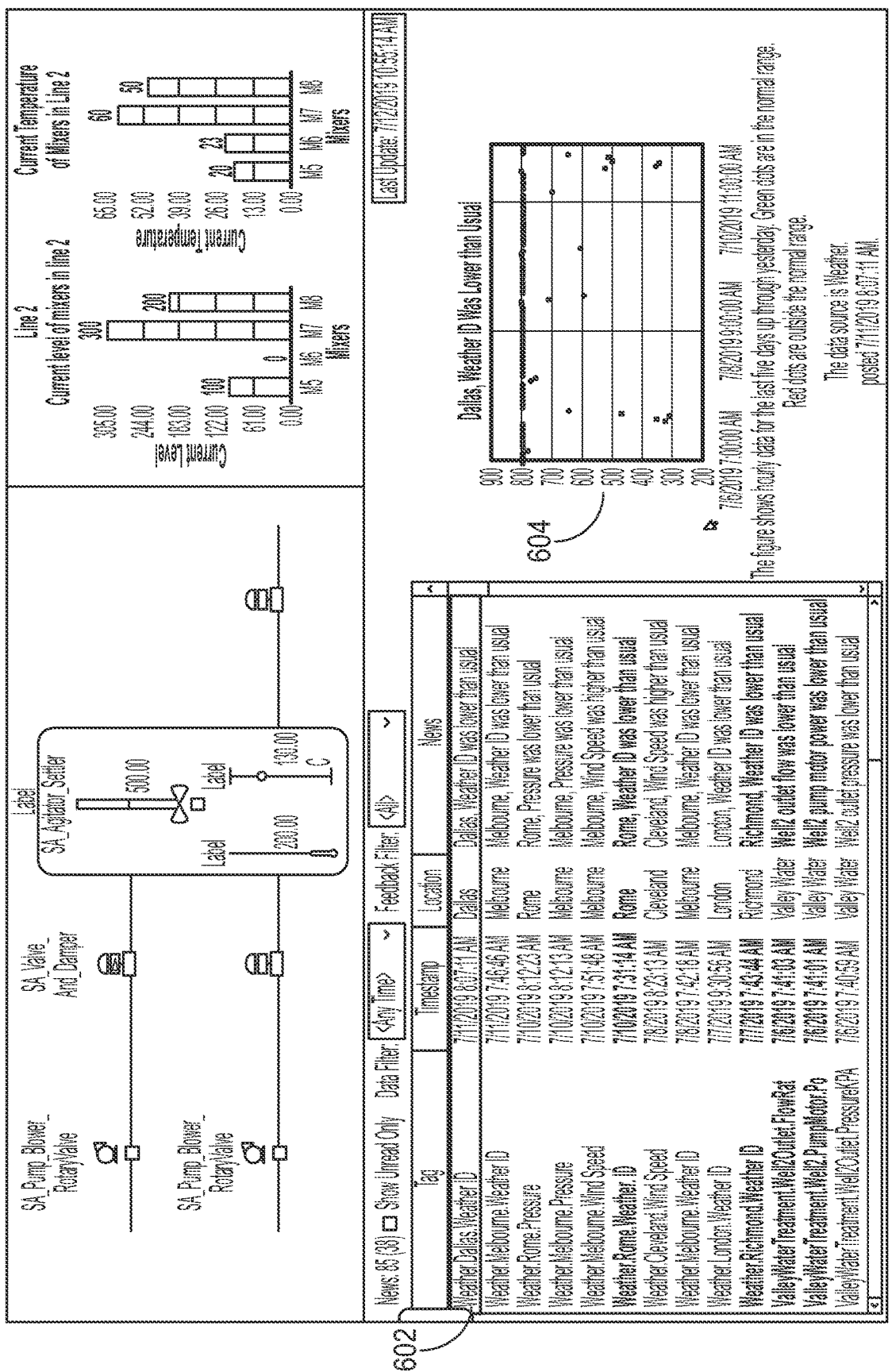
FIG. 6 illustrates a non-limiting example embodiment of a UI and its functionality included therein according to some embodiments of the present disclosure.

FIG. 6 illustrates an example embodiment of a UI 600, where upon selection of a task 602 from listing 508, its data can be visually displayed within portion 604. In a similar manner as discussed above in relation to items 504 and 506, portion 604 can be a dedicated portion of UI 600. Such portion, for example, can display asset functionality for particular tasks selected from listing 508. In some embodiments, portion 604 can illustrate the current or past measurements or attributes of particular assets operating at particular locations in association with a particular operation(s).

In some embodiments, portion 604 can be selected and moved to different positions of the UI. In some embodiments, portion 604 can be moved into a different window and displayed adjacent window to the UI 600. In some embodiments, portion 604 can be displayed as a separate tab(s) within UI, where listing 508 is one tab, and the other interactive tab corresponds to portion 604.

Turning now to FIG. 10, UI 1000 is depicted which enables navigation of set of content/information via navigation control 1002. In some embodiments, control 1002 can correspond to a particular event, operation, task or operation of an asset, and the like, or some combination thereof. In some embodiments, as illustrated in example embodiment of UI 1000 within FIG. 10, control 1002 can correspond to a hierarchy of locations.

The navigation caused via selection from control 1002 produces a listing 1004 which displays asset data for particular tasks in accordance with the selection—which can be filtered, for example, in a manner as discussed above in relation to items 510-514, as discussed above (and pictured in UI 1000, e.g., a "feedback" column). For example, in some embodiments, the listing 1004 can be updated accordingly to show asset data (e.g., anomalies) only from a particular location.

It should be understood that while UI 1000 only displays the feedback option, it should not be construed as limiting, as any other type of filtering option available to UI 500 or UI 600 is available within UI 1000, and vice versa.

In some embodiments, a user can navigate to another page through the navigation control 1002. In some embodiments, the control 1002 can check whether new anomalies are detected. Such check or monitoring can occur periodically. In some embodiments, the control 1002 can automatically update, without user input, the list if new anomalies are found. Such updating can be indicated in a similar manner as item 516 in UI 500, as discussed above.

Turning now to FIG. 11, Process 1100 details a non-limiting embodiment according to some embodiments for automatically generating and dynamically updating an interactive user interface (UI) that comprises digital information related to multiple processes and operations. The UI provides uniform functionality across platforms, devices and/or services being utilized to view and/or interact with the UI and/or interface objects (e.g., tiles) included therein. The UI provides a dynamic mechanism for assets to be controlled, as well as mechanisms to compare the data of different assets by which certain assets can be subsequently manipulated. The UI enables the detection, and contextualized visualization of operational data for assets and/or locations in distributed SCADA systems in Cloud connected environments.

According to some embodiments of Process 1100, Step 1102 is performed by asset data module 402 of UI engine 400; Steps 1104 and 1110 are performed by compilation module 406; Steps 1106-1108 are performed by filter module 404; Steps 1112-1116 are performed by display module 408.

Process 1100 begins with Step 1102 where operation or asset data corresponding to a set of assets associated with at least one operation at a location(s) is received. As discussed above, the asset data corresponds to data collected by instruments, tools or other devices related to the operation of assets at a location.

Assets, for purposes of this discussion, will relate to physical tools or mechanical instruments operating at a location. However, it should not be construed as limiting, as assets can also be computerized programs, applications or other electronic devices that operate computer instructions on such physical equipment.

For purposes of this discussion, the asset data will relate to data collected in relation to a physical asset(s)'s operation at a location(s) for a time period, such that the data indicates the occurrence of at least one anomaly. The asset data, therefore, in some embodiments, is received in Step 1102 when a threshold satisfying number of anomalies is detected for an asset. Upon such detection, anomaly asset data is compiled and received by engine 400.

Step 1102 further involves the storage of the asset data in a data store associated with engine 400. For example, database 420, as discussed above. The storage can involve storage in a cloud based, or cloud hosted system. According to some embodiments, such storage can involve any known or to be known storage technique, technology or algorithm, but is not limited to, storage using a look-up table (LUT), hash tree, blockchain, indexing, and the like, or some combination thereof.

According to some embodiments, the asset data is received and stored in a cloud-based cache (also referred to as a network-based cache), thereby making it accessible to engine 400. In such embodiments, as anomalies are detected at particular locations, the anomaly data is automatically captured and sent to the network cache for subsequent processing and display by engine 400, as discussed herein in relation to Process 1100.

In Step 1104, a UI is generated where the received asset data for a particular operation is displayed. In some embodiments, the displayed asset information within the UI can be configured to be tied to a SCADA navigation context. Some non-limiting example embodiments of such display are illustrated in FIGS. 5, 6 and 10, as discussed above.

According to some embodiments, the asset data can be displayed as interactive asset information that is selectable, and/or displayable in any type of known or to be known form, type or format, such as, but not limited to, graphs, tiles, A/R, V/R, and the like.

According to some embodiments, engine 400 can perform analysis on the data received in Step 1102 in order to display at least a portion of it within the generated UI of Step 1104. According to some embodiments, such analysis, can involve any type of known or to be known computational analysis technique, including but not limited to, vector analysis, data mining, computer vision, machine learning, neural network, artificial intelligence, and the like, or some combination thereof.

Turning to Step 1106, upon the UI being displayed, as illustrated in FIGS. 5, 6 and 10, input can be received which includes instructions to filter, sort or search for particular items of information within the received and displayed asset information.

In some embodiments, the input can be provided by a user in response to viewing the displayed asset information and interacting with, for example, a filter menu as depicted above in relation to items 510-514 of FIGS. 5 and 7-9.

In some embodiments, the input can be computer generated. For example, upon data being displayed, a computer script, program or application can be executing at a location to check for anomaly information according to a certain criteria. This can be part of a maintenance program running at a site or part of an overall audit of an asset's operation.

In some embodiments, the input can be a result of a machine learning component of engine 400. As discussed below, as data is displayed and filtered, which causes modifications in particular types and forms of data being displayed, engine 400 can be trained to understand which type of anomalies users are most interested in. Therefore, upon detecting that new anomaly data is displayed, engine 400 can automatically filter the display to showcase the anomaly data that is of most interest to the user, or is most pertinent to ensuring the integrity of a location's assets' operation.

By way of a non-limiting example, input to filter the content/information displayed on the UI can be in relation to the interactive filtering components discussed above in relation to FIGS. 5, 7, 8, 9 and 10. For example, input can request sorted/filtered information of particular anomalies that are of a particular type of anomaly (e.g., via item 510), that have occurred within/during a particular time frame, and/or that have received feedback (e.g., via item 514), or some combination thereof, as discussed above. In another example, an input can be a navigation request to locate specific anomalies of a particular location, as discussed above in relation to control 1002 of FIG. 10.

In Step 1108, the displayed and/or selected (via the input) asset data is analyzed based on the filter input from Step 1106. In some embodiments, such filtering can involve generating a search query that includes information related to the filter input, then executing a search of the stored asset data (at the database 420 and/or at the network cache). This search can return a narrowed version of the displayed data according to the filter input.

According to some embodiments, the analysis and searching of Step 1108 can be performed via engine 400 performing any type of known or to be known computational analysis technique, including but not limited to, vector analysis, data mining, computer vision, machine learning, neural network, artificial intelligence, and the like, or some combination thereof.

In Step 1110, the UI is modified to include the filtered results from Steps 1106-1108; and, as a result, the modified UI is displayed. Step 1112. In some embodiments, the displayed asset information within the UI can be configured to be tied to a SCADA navigation context.

According to some embodiments, the modified UI can involve altering how data is displayed, a reduction or increase in amount of data displayed, and the like, or some combination thereof.

For example, a filter input from Step 1106 can request only anomalies that have received particular types of feedback. Thus, the listing of information can be reduced (e.g., listing 508 in FIG. 8). In some embodiments, however, now additional data can be displayed which illustrates components of the remaining listing data. For example, a new UI portion (e.g. items 504 and/or 506 of FIG. 5, or portion 604 in FIG. 6) can be displayed. This modifies the look and feel of the UI 500, and now illustrates additional data that was not previously displayed therein.

In some embodiments, the input can also change a manner in which data is displayed. For example, an input request can request data to be displayed in one format that is different than how it is originally being displayed. This can cause a modification in the data structure of the displayed data thereby causing it to change from one type of data structure format to another, thereby altering not only how it is rendered, but how the UI is rendered and how engine 400 facilitates such rendering.

For example, if data was originally displayed as a line graph, yet the user wants to virtually display the information as an overlay of a real-world capture, the line graph can be altered to an A/R view, which can be realized via the UI. In such embodiments, engine 400 can utilize camera capabilities of a device to modify the UI's display.

In some embodiments, as discussed above in relation to items 510-514 and FIGS. 5 and 7-9, the modification of the UI can also or alternatively include modifying the filtering menus by which the asset data can be sorted, searched or filtered.

Upon displaying the modified UI in Step 1112, information in relation to how the UI was modified (e.g., from Step 1110) and why it was modified (e.g., the filter input and analysis from Steps 1106-1108) can be fed back to the compilation module 406 of engine 400 via the depicted feed back loop between Steps 1112 and 1104. As discussed above, this enables engine 400 to more accurately analyze (e.g., understand by being trained on the fed back data) and display particular types or forms of data in desired formats based on viewing and/or interactive behaviors of a user(s). In some embodiments, such additional data can enable engine 400 to more accurately request, retrieve, collect and/or monitor for future anomalies from similar assets or from particular locations.

Process 1100 now proceeds to Step 1114, where the UI facilitates an electronic, networked connection to distributed systems via the displayed UI. Such connection can be established upon display of the UI (as per Step 1104), or in response to a modified UI (as per Step 1112), as depicted in FIG. 11.

As a result of the established connection in Step 1114, the UI can provide a user with computerized controls of particular assets or operations occurring at a location.

By way of a non-limiting example, a user is presented asset data from UI 500 of FIG. 5. The user selects item 602 from listing 508, and its data is displayed in portion 604 (as illustrated in FIG. 6). The user then provides an input that requests "relevant anomalies" (item 510), over the last 24 hours (item 512), with feedback that indicates "relevant anomalies" (item 514). The user also provides a navigation request for data from a particular location from control 1002.

This, according to this example, therefore, narrows the results of anomaly data according to the requested criteria and results in a modified UI being displayed. For example, the user can view anomaly data of a physical asset at the jobsite in Sydney, Australia that was collected for the past 24 hours.

As discussed herein, the UI enables a direct connection to this remote jobsite, where the user can be provided control over that particular asset. The user can, for example, perform maintenance on the asset in order to remedy the anomaly indicated by the filtered data.

According to some embodiments, as a result of Step 1116, data corresponding to how an asset is controlled can be collected and fed back to Steps 1102, or 1104 or 1112. The information related to how particular assets are controlled in response to detected anomalies can drive how future anomaly data is requested, collected, retrieved and/or ignored (e.g., Step 1102), and can also impact how and when it is displayed (e.g., Steps 1104 and/or 1112).

Thus, as a result of the execution of Steps 1102-1116, the UI (e.g., UIs 500, 600 and 1000, for example) provides functionality across platforms, devices and/or services being utilized to view and/or interact with the UI and/or interface objects included therein. The UI provides a dynamic mechanism for assets to be controlled, as well as mechanisms to compare the data of different assets by which certain assets can be subsequently manipulated. The UI enables the detection, and contextualized visualization of operational data for assets and/or locations in distributed supervisory control and data acquisition (SCADA) systems in Cloud connected environments.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternative embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A computing device comprising:
   one or more processors;
   a non-transitory computer-readable memory having stored therein computer-executable instructions, that when executed by the one or more processors, cause the one or more processors to perform actions causing a display of a user interface (UI), the actions comprising:
   receiving, over a network, electronic data related to an operation of a physical asset at location, the electronic data representing at least one detected anomaly by the asset during a time period and being received when a threshold satisfying a number of anomalies are detected for the physical asset;
   creating the UI in response to receiving the electronic data representing the at least one detected anomaly, the created UI comprising functionality for visibly displaying at least a portion of the received electronic data as interactive digital content based on analysis of the received electronic data;
   causing to be displayed, over the network, the UI on a display of a first client device;
   receiving, from the first client device, a request to filter the displayed electronic data for specific anomalies;
   modifying the UI by automatically altering a quantity and type of interactive digital content displayed within the UI in response to receiving the filter request for the displayed electronic data;
   receiving, over the network, input from a second client device respective to a portion of the altered digital content, the portion corresponding to an anomaly by the asset;
   electronically establishing, over the network, an electronic connection between the first client device and a device associated the asset and the location in response to the displaying of the UI or to the modification of the UI, said electronic connection comprising functionality enabling the first client device to control the asset over the network via the modified UI;
   receive, over the network, a control command for the asset from the first client device via the modified UI, the control command corresponding to a remedy for the anomaly by the asset;
   store, in the non-transitory computer-readable memory, control data comprising the control command; and
   alter, how and/or when future anomaly data is one or more of requested, collected, retrieved, ignored, and displayed by using the control data associated with the anomaly by the asset as part of a basis of analysis of future electronic data related to the operation of the physical asset at the location.

2. The computing device of claim 1, further comprising: storing the electronic data in a cloud-based, network cache, wherein said receiving of the electronic data comprises retrieving the electronic data from the cache.

3. The computing device of claim 1, wherein said control comprises executing an application over the network, via the UI, that performs a maintenance operation on the asset.

4. The computing device of claim 1, wherein said filter request is in response to interaction with at least a portion of the interactive digital content.

5. The computing device of claim 1, further comprising:
   analyzing the electronic data of the asset; and
   automatically generating, without user input, said filter request based on said analysis.

6. The computing device of claim 1, wherein said filter request comprises a set of criteria corresponding to a type of data included in the electronic data related to an anomaly.

7. The computing device of claim 1, wherein said filter request enables navigation of particular types of asset data related to a plurality of locations.

8. The computing device of claim 1, wherein said electronic connection is established upon initial display of the UI on the first client device.

9. The computing device of claim 1, further comprising: collecting information related to the control over the asset.

10. The computing device of claim 9, further comprising: receiving a second set of electronic data based at least in part on the collected information.

11. The computing device of claim 1, further comprising: collecting information related to the filter request and said modification of the UI.

12. The computing device of claim 11, further comprising:
receiving a second set of electronic data; and
causing the UI to be updated based on the second set of electronic data and the collected information.

13. The computing device of claim 1, further comprising:
analyzing the received electronic data; and
determining a type of display format for the electronic data based on said analysis, wherein the display of the electronic data within the UI is based at least in part on said determined type.

14. A method comprising:
receiving, by a computing device, over a network, electronic data related to an operation of a physical asset at location, the electronic data representing at least one detected anomaly by the asset during a time period and being received when a threshold satisfying a number of anomalies are detected for the physical asset;
creating, by the computing device, a user interface (UI) in response to receiving the electronic data representing the at least one detected anomaly, the created UI comprising functionality for visibly displaying at least a portion of the received electronic data as interactive digital content based on analysis of the received electronic data;
causing to be displayed, by the computing device, over the network, the UI on a display of a first client device;
receiving, by the computing device, from the first client device, a request to filter the displayed electronic data for specific anomalies;
modifying, by the computing device, the UI by automatically altering a quantity and type of interactive digital content displayed within the UI in response to receiving the filter request for the displayed electronic data;
receiving, by the computing device, over the network, input from a second client device respective to a portion of the altered digital content, the portion corresponding to an anomaly by the asset;
electronically establishing, by the computing device, over the network, an electronic connection between the first client device and a device associated the asset and the location in response to the displaying of the UI or to the modification of the UI, said electronic connection comprising functionality enabling the first client device to control the asset over the network via the modified UI;
receive, over the network, a control command for the asset from the first client device via the modified UI, the control command corresponding to a remedy for the anomaly by the asset;
store, in the non-transitory computer-readable memory, control data comprising the control command; and
alter, how and/or when future anomaly data is one or more of requested, collected, retrieved, ignored, and displayed by using the control data associated with the anomaly by the asset as part of a basis of analysis of future electronic data related to the operation of the physical asset at the location.

15. The method of claim 14, further comprising:
storing the electronic data in a cloud-based, network cache, wherein said receiving of the electronic data comprises retrieving the electronic data from the cache.

16. The method of claim 14, further comprising:
collecting information related to the control over the asset; and
receiving a second set of electronic data based at least in part on the collected information.

17. The method of claim 14, further comprising:
collecting information related to the filter request and said modification of the UI;
receiving a second set of electronic data; and
causing the UI to be updated based on the second set of electronic data and the collected information.

18. The method of claim 14, further comprising:
analyzing the received electronic data; and
determining a type of display format for the electronic data based on said analysis, wherein the display of the electronic data within the UI is based at least in part on said determined type.

19. A non-transitory computer-readable storage medium tangibly encoded with computer-executable instructions, that when executed by a processor associated with a computing device, performs a method comprising:
receiving, by the computing device, over a network, electronic data related to an operation of a physical asset at location, the electronic data representing at least one detected anomaly by the asset during a time period and being received when a threshold satisfying a number of anomalies are detected for the physical asset;
creating, by the computing device, a user interface (UI) in response to receiving the electronic data representing the at least one detected anomaly, the created UI comprising functionality for visibly displaying at least a portion of the received electronic data as interactive digital content based on analysis of the received electronic data;
causing to be displayed, by the computing device, over the network, the UI on a display of a first client device;
receiving, by the computing device, from the first client device, a request to filter the displayed electronic data for specific anomalies;
modifying, by the computing device, the UI by automatically altering a quantity and type of interactive digital content displayed within the UI in response to receiving the filter request for the displayed electronic data;
receiving, by the computing device, over the network, input from a second client device respective to a portion of the altered digital content, the portion corresponding to an anomaly by the asset;
electronically establishing, by the computing device, over the network, an electronic connection between the first client device and a device associated the asset and the location in response to the displaying of the UI or to the modification of the UI, said electronic connection comprising functionality enabling the first client device to control the asset over the network via the modified UI;
receive, over the network, a control command for the asset from the first client device via the modified UI, the control command corresponding to a remedy for the anomaly by the asset;
store, in the non-transitory computer-readable memory, control data comprising the control command; and
alter, how and/or when future anomaly data is one or more of requested, collected, retrieved, ignored, and displayed by using the control data associated with the anomaly by the asset as part of a basis of analysis of future electronic data related to the operation of the physical asset at the location.

20. The non-transitory computer-readable storage medium of claim 19, further comprising:
 storing the electronic data in a cloud-based, network cache, wherein said receiving of the electronic data comprises retrieving the electronic data from the cache.

* * * * *